US010180961B2

(12) United States Patent
Au et al.

(10) Patent No.: US 10,180,961 B2
(45) Date of Patent: Jan. 15, 2019

(54) REMOTE NESTED JOIN BETWEEN PRIMARY ACCESS MODULE PROCESSORS (AMPS)

(71) Applicant: Teradata US, Inc., Dayton, OH (US)

(72) Inventors: Grace Kwan-On Au, Rancho Palos Verdes, CA (US); Mohammed Al-Kateb, Rolling Hills Estates, CA (US)

(73) Assignee: Teradata US, Inc., Dayton, OH (US)

( * ) Notice: Subject to any disclaimer, the term of this patent is extended or adjusted under 35 U.S.C. 154(b) by 617 days.

(21) Appl. No.: 14/574,347

(22) Filed: Dec. 17, 2014

(65) Prior Publication Data

US 2016/0179886 A1    Jun. 23, 2016

(51) Int. Cl.
*G06F 17/30* (2006.01)

(52) U.S. Cl.
CPC .............................. *G06F 17/30498* (2013.01)

(58) Field of Classification Search
CPC ......... G06F 17/30466; G06F 17/30469; G06F 17/30471; G06F 17/30498; G06F 17/30513; G06F 17/30545; G06F 17/30548; G06F 17/30628; G06F 17/30422; G06F 17/30442; G06F 17/30445; G06F 17/30451; G06F 17/30454; G06F 17/3046; G06F 17/30463; G06F 17/30336; G06F 17/30315; G06F 17/30342; G06F 17/3033

USPC ....... 707/713, 714, 715, 716, 717, 718, 719, 707/720, 721, 747, 774, 790, E17.017
See application file for complete search history.

(56) References Cited

U.S. PATENT DOCUMENTS

| | | | |
|---|---|---|---|
| 6,374,235 B1 * | 4/2002 | Chen | G06F 17/30466 |
| 8,972,381 B2 * | 3/2015 | Al-Kateb | G06F 17/30466 706/12 |
| 2002/0026438 A1 * | 2/2002 | Rjaibi | G06F 17/30469 |
| 2006/0167865 A1 | 7/2006 | Andrei | |
| 2006/0218123 A1 * | 9/2006 | Chowdhuri | G06F 17/30445 |
| 2009/0063527 A1 * | 3/2009 | Corvinelli | G06F 17/30466 |
| 2009/0327216 A1 * | 12/2009 | Brown | G06F 17/30474 |
| 2010/0088309 A1 * | 4/2010 | Petculescu | G06F 17/3048 707/714 |
| 2011/0093499 A1 * | 4/2011 | Zhou | G06F 17/30445 707/770 |
| 2013/0232133 A1 | 9/2013 | Al-Omari et al. | |
| 2014/0181076 A1 | 6/2014 | Au et al. | |
| 2014/0181077 A1 | 6/2014 | Al-Kateb | |
| 2014/0214794 A1 | 7/2014 | Attaluri et al. | |

* cited by examiner

*Primary Examiner* — Greta L Robinson
(74) *Attorney, Agent, or Firm* — Schwegman, Lundberg & Woessner, P.A.

(57) ABSTRACT

A query optimizer identifies a condition that supports a remote nested join. A first Access Module Processor (AMP) is sent the condition to obtain a first set of rows that satisfy the condition from a first table and the first AMP is instructed to perform the remote nested join with a second remote AMP to acquire a second set of rows that satisfy the condition from a second table. The first AMP joins the first set of rows and the second set of rows as a join result, which is returned to the query optimizer.

5 Claims, 3 Drawing Sheets

REMOTE NESTED JOIN BETWEEN PRIMARY ACCESS MODULE PROCESSORS (AMPS)

BACKGROUND

A database join operation combines records from more than one database table. A join essentially creates a set that can be saved as its own independent database table. There are a variety of types of joins.

One type of join is called a nested join. A nested join is an efficient join method that, depending on conditions of join query, may be applicable when one of the tables of a join operation has a secondary index or a unique primary index. One flavor of nested join is a remote nested join, which has two key characteristics. First, a remote nested join does not require the other table to be redistributed or duplicated. Instead, a message is sent from one Access Module Processor (AMP) to another AMP (hence named "remote") to get the matching rows from the other table. Second, a remote nested join can carry out the join operation in a single-AMP or two-AMP step process. Accordingly, a remote nested join reduces the total number of AMPs participating in processing the join query. These two characteristics encourage query optimizers to select remote nested joins as the most efficient join techniques when available.

However, the availability of remote nested joins may be limited for a particular query or type of tables associated with the particular query. Therefore, usage in Relational Database Management Systems (RDBMSs) may be limited or restricted.

Therefore, there is a need to improve usage and availability of remote nested joins in RDBMSs.

SUMMARY

In various embodiments, techniques and a system for remote nested join processing between Primary Access Module Processors (AMP) are presented. According to an embodiment, a method for processing a remote nested join for a query is provided.

Specifically, a condition is identified that supports a remote nested join between a first table and a second table of a Relational Database Management System (RDBMS). Next, the condition is sent to a first AMP having first rows from the first table that satisfy the condition and the first AMP is instructed to identify a second AMP to perform a remote nested join on second rows obtained from the second table with the first rows and provide a join result from the remote nested join. The second AMP includes the second rows that also satisfy the condition.

DETAILED DESCRIPTION

Figure 1:
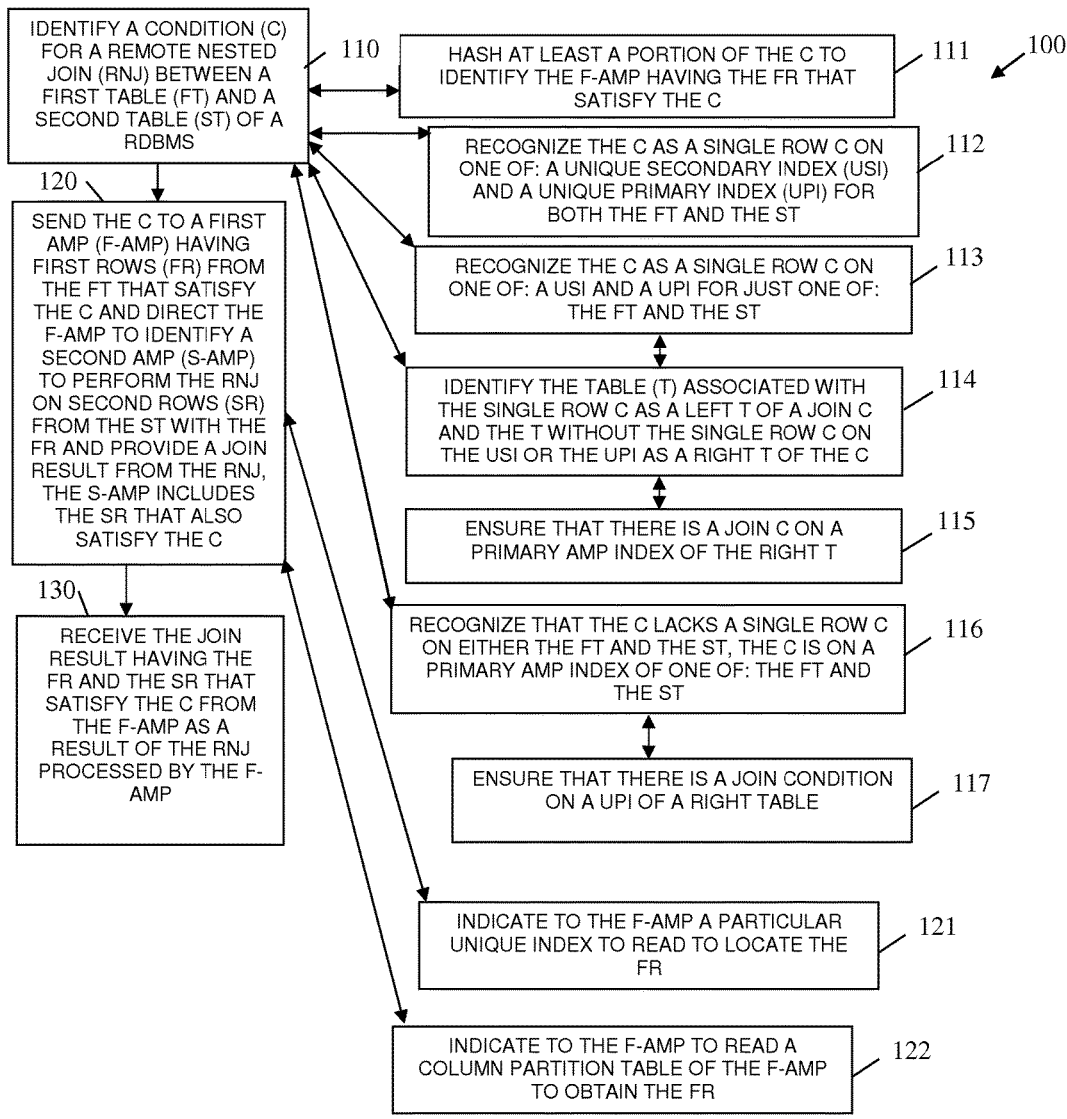
FIG. 1 is diagrams of a method for processing a remote nested join for a query, according to an example embodiment.

FIG. 1 is diagrams of a method 100 for processing a remote nested join for a query, according to an example embodiment. The method 100 (hereinafter "query optimizer") resides and/or is programmed within memory and/or a non-transitory computer-readable storage medium as executable instructions. The instructions are executed on one or more processors of a network and the network can be wired, wireless, or a combination of wired and wireless.

Before discussing the processing of the query optimizer some initial embodiments and examples details of the query optimizer are presented, followed by how a query is then processed with the new and novel techniques presented herein and below, where that query includes at least one remote nested join (and discussed with the context of the FIG. 1).

The techniques and system presented herein provides support and enables remote nested join on Column Partitioned (CP) tables with Primary Amp (PA) index. Any, remote nested join, if and when applicable for a query, is considered by the query optimizer as the most efficient join operation to process on behalf of the query. CP PA tables are a new physical RDBMS table design that features advantages from both Primary Index (PI) tables (e.g., more optimal plans) and No PI (NoPI) tables (e.g., relatively faster data loading). Supporting remote nested join on CP PA tables improves resource utilization of certain and important classes of tactical join queries on the new structure of CP tables with the PA.

So, the techniques and system presented herein support and enable remote nested join operations on CP tables with Primary Amp (PA) index. Again, the CP PA tables represent a new table structure in which rows of a CP table are hash-distributed to the AMPs but, on each AMP, the rows are not in any particular order. CP PA tables are a significant table design because, from one end, they have the value of some optimal plans of PI tables, which cannot be applied to NoPI tables (e.g., local joins and aggregations) and, from the other end, they have some of the benefits of NoPI tables that are considered drawbacks of PI tables (e.g., faster data loading).

Supporting remote nested joins on CP PA tables can improve resource utilization of certain class of tactical join queries on the new structure of CP tables with PA. Conventionally, query optimizers do not have the capability to generate remote nested join plans for CP PA tables so resorting to a traditional plan of duplicating or redistributing one or both of the tables to all AMPs or a group of AMPs is the best thing that can presently be done by the query optimizers. So, supporting remote nested joins on CP PA table allows the joins to be done on a few specific AMPs with no table lock required. This dramatically increases the throughput of mixed workloads on large-scale RDBMSs.

The techniques and system herein allow a query optimizer to generate remote nested join plans over CP PA tables, which enhances the query execution engine to execute the generated plans. Remote nested join plans are selected by the query optimizer for three scenarios of queries. The first scenario is when query has single-row condition (on a Unique Secondary Index (USI)/Unique Primary Index (UPI)) on both tables. For this case, the query may or may not have join condition between the two tables. The second scenario is when query has a single-row condition (on USI/UPI) on only one of the tables, referred to as the left table. For this case, there has to be a join condition on the (PI/UPI/USI) of the right table. The third scenario is when query does not have a single-row condition on either of the relations but has a condition on the PI of one of the tables, referred to as the left table. For this case, the query has to have a join condition on the UPI of the right table.

The query optimizer (of the FIG. 1) enables remote nested joins for a CP PA table in all the aforementioned three scenarios. For the first scenario, the query optimizer is trained to detect the presence of USI on a CP PA table and the execution engine is enhanced to support remote access of the CP PA table "by way of unique index." For this case, the RDBMS can use unique index read mode. For the second scenario, query optimizer is trained to detect the presence of a join condition on the PA of the right table. For the third scenario, query optimizer is trained to detect the presence of a join condition on the PA of the left table. For the remote nested join plan in scenarios two and three, execution engine is enhanced to support remote access of the CP PA tables by "way of primary AMP index." For this case, a "HashedAll-Rows" read mode is provided to access the AMP that has the matching rows from the CP PA table and then find the qualifying rows by scanning and examining all the rows on that AMP.

Some example, pseudo code and examples are now presented—one example for each scenario—for using remote nested join on CP PA tables. The following Data Definition Language (DDL) is provided for the examples that follow:

```
/* CP PA table with USI */
   ct t1 (a1 int, b1 int, c1 int) partition by column, primary amp
index(a1), unique index (c1);
   /* CP PA table with USI */
   ct t2 (a2 int, b2 int, c2 int) partition by column, primary amp
index(a2), unique index (c2);
      /* PI table with UPI and USI*/
      ct t3 (a3 int, b3 int, c3 int) unique primary index (a3), unique
   index (c3);
```

Scenario #1

In the following example, a two-AMP remote nested join plan appears as shown below. It is noted that both tables are CP PA and they both accessed "by way of unique index."

explain sel * from t1, t2 where c1=1 and c2=2;

Explanation of Scenario #1

A two-AMP JOIN operation is performed from 3 column partitions of (IDR=Integrated Data Repository) IDR.t2 by way of unique index #4 "IDR.t2.c2=2," which is joined to 3 column partitions of IDR.t1 by way of unique index #4 "IDR.t1.c1=1." IDR.t2 and IDR.t1 are joined using a nested join, with a join condition of ("(1=1)"). The result goes into Spool 1 (one-AMP), which is built locally on the AMPs. The size of Spool 1 is estimated with high confidence to be 1 row (87 bytes). The estimated time for this step is 0.13 seconds in time trials.

Scenario #2

For the following example, a two-AMP remote nested join plan appears as shown below. It is noted that both tables are CP PA. One table is accessed "by way of unique index," while the other table is accessed "way of primary AMP index."

explain sel * from t1,t2 where a1=b2 and c2=2;

Explanation of Scenario #2

First, a two-AMP JOIN operation is processed from 3 column partitions of IDR.t2 by way of unique index #4 "IDR.t2.c2=2," which is joined to 3 column partitions of IDR.t1 by way of primary AMP index. IDR.t2 and IDR.t1 are joined using a nested join, with a join condition of ("IDR.t1.a1=IDR.t2.b2"). The result goes into Spool 1 (one-amp), which is built locally on the AMPs. The size of Spool 1 is estimated with low confidence to be 2 rows (174 bytes). The estimated time for this step is 0.08 seconds in time trials.

The contents of Spool 1 are sent back to the user as the result of statement 1. The total estimated time is 0.08 seconds in time trials.

Scenario #3

In the following example, the plan generates a single-AMP JOIN operation for a remote nested join. It is noted that one table is CP PA table and is accessed "by way of primary AMP index," while the other table is a regular PI table accessed "way of the unique primary index."

explain sel * from t1,t3 where a3=b1 and a1=1;

Explanation of Scenario #3

First, a single-AMP JOIN operation is processed from IDR.t1 by way of the by way of primary AMP index "IDR.t1.a1=1," which is joined to IDR.t3 by way of the unique primary index "IDR.t3.a3=IDR.t1.b1" with no residual conditions. IDR.t1 and IDR.t3 are joined using a nested join, with a join condition of ("IDR.t3.a3=IDR.t1.b1"). The result goes into Spool 1 (one-AMP), which is built locally on the AMPs. The size of Spool 1 is estimated with low confidence to be 1 row (87 bytes). The estimated time for this step is 0.06 seconds in time trials. The contents of Spool 1 are sent back to the user as the result of statement 1. The total estimated time is 0.06 seconds in time trials.

This processing is now again discussed with reference to the FIG. 1 and the processing of the query optimizer.

In an embodiment, the query optimizer executes on one or more processors associated with a RDBMS.

At 110, the query optimizer identifies a condition in a query that is being processed within a RDBMS that can support a remote nested join between first rows of a first table and second rows of a second table.

The rows of each table are hash distributed to different AMPs of the RDBMS prior to the execution of the query optimizer. This was discussed above. Moreover, the AMPs may reside on different processors of the distributed RDBMS and can, in some instances, process in parallel to one another when assisting the query optimizer in obtaining results for the query.

According to an embodiment, at 111, the query optimizer hashes at least a portion of the condition to identify a first AMP having first rows that satisfy the condition.

In an embodiment, at 112, the query optimizer recognizes the condition as a single row condition on a USI or a UPI on both the first table and the second table.

In an embodiment, at 113, the query optimizer recognizes the condition as a single row condition on a USI or a UPI for just the first table or for just the second table.

In an embodiment of 113 and at 114, the query optimizer identifies the table (first or second table) associated with the single row condition as a left table of the join condition and the table (other table) without the single row condition on the USI or the UPI as a right table of the condition.

In an embodiment of 114 and at 115, the query optimizer ensures that there is a join condition on a Primary Amp (PA) index of the right table.

In an embodiment, at 116, the query optimizer recognizes that the condition lacks a single row condition on either the first table or second table. The condition is on a PA index of the first table or the second table.

In an embodiment of 116 and at 117, the query optimizer ensures that there is a join condition on a unique primary index of a right table of the condition.

The embodiment depicted at 112, 113, and 116 identify three scenarios for the condition that the query optimizer recognizes that the remote nested join can be processed on utilizing two AMPs. This was discussed above at the start of the discussion of the FIG. 1 along with some example situations.

At 120, the query optimizer sends the condition to a first AMP (initial AMP) that the query optimizer identified as having access to the first rows from the first table that satisfies the condition. The query optimizer then directs the first AMP to identify a second and remote AMP (remote from the first AMP) to perform the remote nested join on second rows from the second table (which the second AMP was identified as having access to) with the first rows and provide a join result as a result from the first AMP processing the remote nested join with the second AMP. The second rows, which the second AMP has access to, also satisfies the condition.

According to an embodiment, at 130, the query optimizer receives the join result having the first rows from the first table and the second rows from the second table as a result of the remote nested join performed by the first AMP in cooperation with the second AMP.

Figure 2:
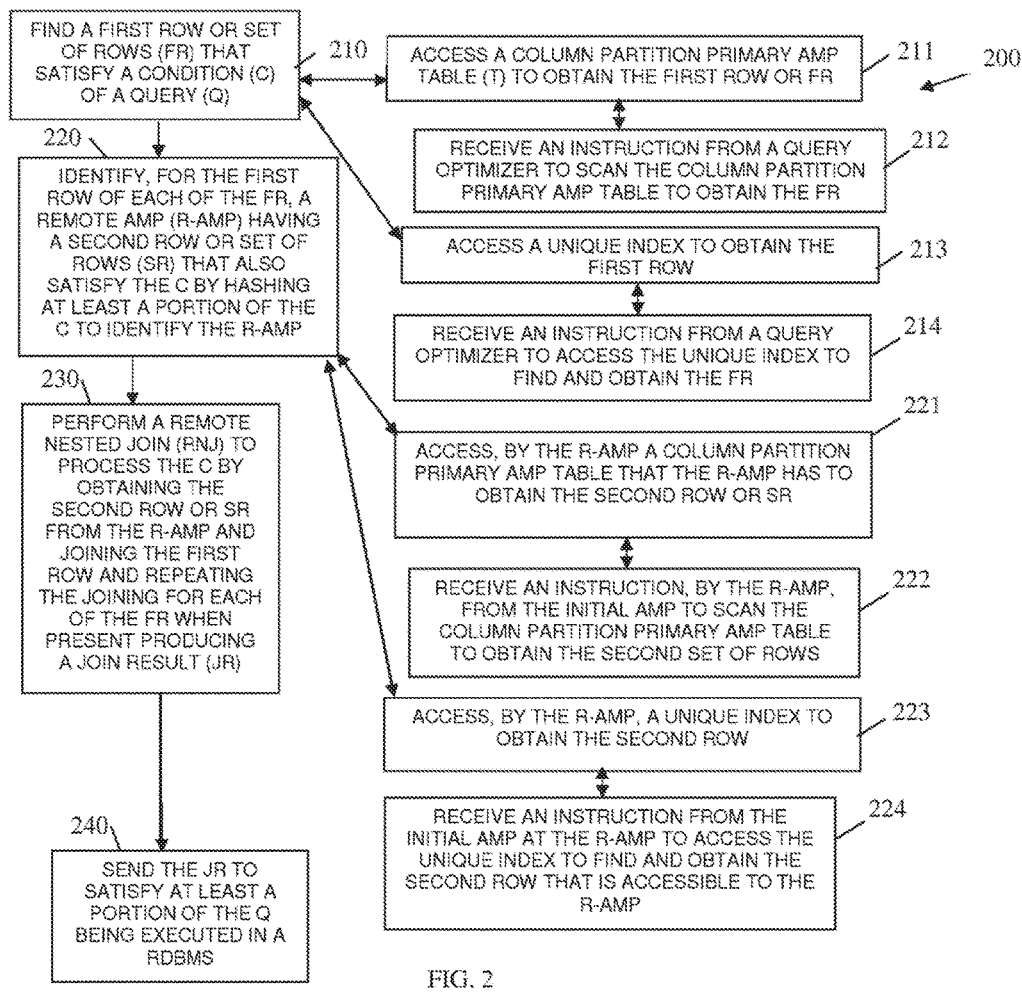
FIG. 2 is diagrams of another method for processing a remote nested join for a query, according to an example embodiment.

FIG. 2 is diagrams of another method 200 for processing a remote nested join for a query, according to an example embodiment. The method 200 (hereinafter referred to as an "initial AMP") is implemented, resides, and is programmed within memory and/or a non-transitory computer-readable storage medium as executable instructions. The instructions are processed on one or more processors of the network and the network is wired, wireless, or a combination of wired and wireless.

The initial AMP interacts with the query optimizer represented by the FIG. 1 and remote AMP to perform a remote nested join for a query.

At 210, the initial AMP finds a first row or set of first set of rows that satisfies a condition of a query. The condition sent from a query optimizer, such as the query optimizer described above with reference to the FIG. 1.

According to an embodiment, at 211, the initial AMP access a column partition primary AMP table that the initial AMP has to obtain the first row or first set of rows.

According to an embodiment of 211 and at 212, the initial AMP receives an instruction from a query optimizer to scan the column partition primary AMP table to obtain the first set of rows.

In an embodiment, at 213, the initial AMP accesses a unique index to obtain the first row.

In an embodiment of 213 and at 214, the initial AMP receives an instruction from a query optimizer to access the unique index to find and obtain the first rows that are accessible to the initial AMP.

At 220, for the first row of each of the first set of rows, the initial AMP identifies a remote AMP having a second set of rows that also satisfy the condition by hashing at least a portion of the condition to identify the remote AMP.

According to an embodiment, at 221, the remote AMP accesses a column partition primary AMP table that the remote AMP has to obtain the second row or set of rows.

According to an embodiment of 221 and at 222, the remote AMP receives an instruction from the initial AMP to scan the column partition primary AMP table to obtain the second set of rows.

In an embodiment, at 223, the remote AMP accesses a unique index to obtain the second row.

In an embodiment of 223 and at 224, the remote AMP receives an instruction from the initial AMP to access the unique index to find and obtain the second row that is accessible to the remote AMP.

At 230, the initial AMP performs a remote nested join to process the condition by obtaining the second row or set of rows from the remote AMP and joining the corresponding first row, and possibly repeating for each of the first set of rows (acquired locally by the initial AMP) as a join result.

According to an embodiment, at 240, the initial AMP sends the join result to satisfy at least a portion of the query being executed in the RDBMS.

Figure 3:
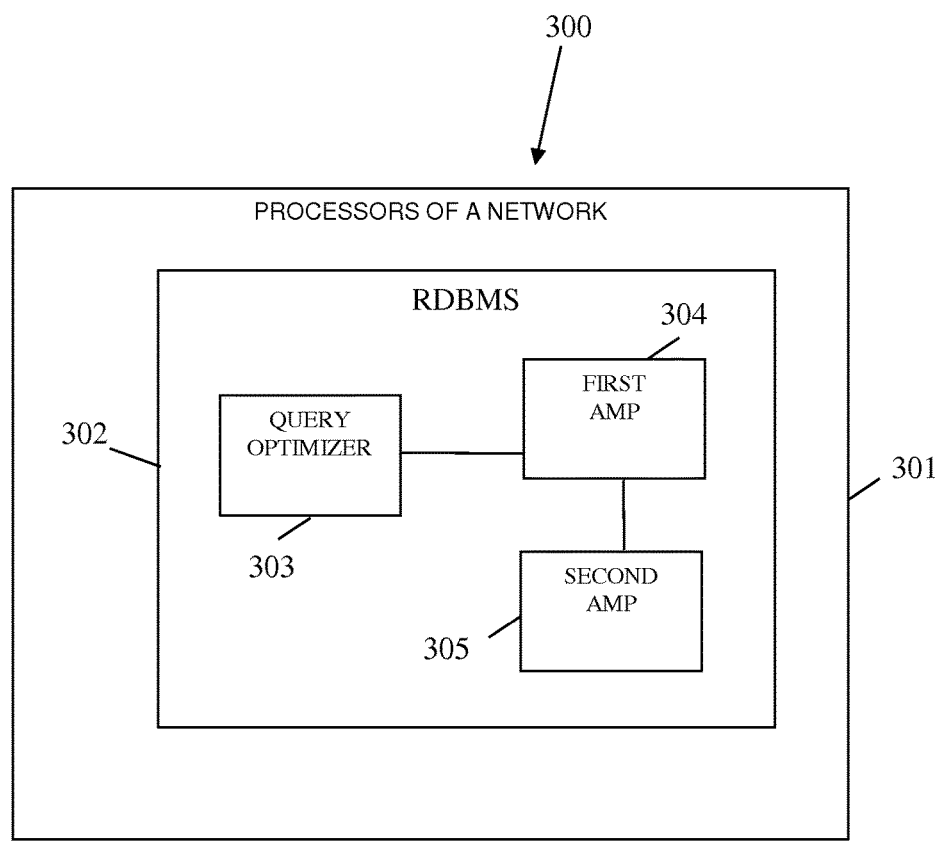
FIG. 3 is a diagram of a remote nested join processing system, according to an example embodiment.

FIG. 3 is a diagram of a remote nested join processing system 300, according to an example embodiment. Some components of the remote nested join processing system 300 are implemented and programmed within memory and/or non-transitory computer-readable medium and executed by one or more processors of a network, and the network is wired, wireless, or a combination of wired and wireless.

In an embodiment, the remote nested join processing system 300 implements, inter alia, the method 100 of the FIG. 1.

In an embodiment, the remote nested join processing system 300 implements, inter alia, the method 200 of the FIG. 2.

In an embodiment, the remote nested join processing system 300 implemented, inter alia, the methods 100 and 200 of the FIGS. 1 and 2.

The remote nested join processing system 300 includes a plurality of processors 301 of a distributed network and a RDMS 302 that executes on the processors 301. The RDMS 302 includes a query optimizer 303. In an embodiment, the remote nested join processing system 300 also includes a first AMP 304 and a second AMP 305.

The query optimizer 303 is configured to: execute on at least one of the processors 301, recognize a condition of a query being processed that can be processed as a remote nested join between the first AMP 304 and the second AMP 305, forward the condition to the first AMP 304 to satisfy a first portion of the condition, and instruct the first AMP 304 to process a remote nested join with the second AMP 305 to satisfy a second portion of the condition.

In an embodiment, the remote nested join processing system 300 includes the first AMP 304. The first AMP 304 is configured to: execute on at least one of the processors 301, obtain a first set of rows that satisfy the first portion of the condition, obtain a second set of rows that satisfy the second portion of the condition from the second AMP 305, and join the first set of rows and the second set of rows as a join result.

In an embodiment, the first AMP 304 is further configured to provide the join result back to the query optimizer 303 to satisfy at least a portion of a query made to the RDMS 302.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   identifying, by a query optimizer executed on a processor, a condition for a remote nested join between a first table and a second table of a Relational Database Management System (RDBMS);
   hashing, by said query optimizer, at least a portion of the condition to identify a first AMP having first rows that satisfy the condition; and
   sending, by the query optimizer, the condition to said first AMP having the first rows from the first table that satisfy the condition and accessing, by the first AMP, a column partition table of the first AMP table to obtain the first rows, directing the first AMP to identify a second AMP to perform the remote nested join on second rows from the second table with the first rows and provide a join result from the remote nested join, wherein the second AMP includes the second rows that also satisfy the condition, and wherein the second AMP is identified by hashing at least a portion of the condition;

wherein identifying further includes recognizing the condition as a single row condition on one of: a unique secondary index and a unique primary index for just one of: the first table and the second table; and wherein recognizing further includes identifying the table associated with the single row condition as a left table of a join condition and the table without the single row condition on the unique secondary index or the unique primary index as a right table of the condition.

2. The method of claim 1, wherein identifying further includes ensuring that there is a join condition on a primary AMP index of the right table.

3. The method of claim 1 further comprising, receiving, by the query optimizer, the join result having the first rows and the second rows that satisfy the condition from the first AMP as a result of the remote nested join processed by the first AMP.

4. A system, comprising:
a plurality of processors; and
a query optimizer of a Relational Database Management System (RDBMS), the query optimizer configured to: i) execute on at least one of the processors, ii) recognize a condition that can be processed as a remote nested join between a first Access Module Processor (AMP) and a second AMP, iii) hash at least a portion of the condition to identify said first AMP, iv), forward the condition for the first AMP to satisfy a first portion of the condition; and v) instruct the first AMP to process the remote nested join with the second AMP to satisfy a second portion of the condition; and wherein:

the first AMP is configured to: i) execute on at least one of the processors, ii) access a first column partition table of the first AMP to obtain a first set of rows that satisfy the first portion of the condition, iii) identify the second AMP by hashing at least a portion of the condition, iv) obtain a second set of rows from a second column partition table of the second AMP that satisfy the second portion of the condition, and v) join the first set of rows and the second set of rows as a join result;

wherein recognizing a condition includes recognizing the condition as a single row condition on one of: a unique secondary index and a unique primary index for just one of: the first column partition table and the second column partition table; and wherein recognizing further includes identifying the table associated with the single row condition as a left table of a join condition and the table without the single row condition on the unique secondary index or the unique primary index as a right table of the condition.

5. The system of claim 4, wherein the first AMP is further configured to: vi) provide the join result back to the query optimizer to satisfy at least a portion of a query made to the RDBMS.

* * * * *